United States Patent
Mueller

(10) Patent No.: US 9,764,265 B2
(45) Date of Patent: Sep. 19, 2017

(54) SWIRL HELICAL ELEMENTS FOR A VISCOUS IMPINGEMENT PARTICLE COLLECTION AND HYDRAULIC REMOVAL SYSTEM

(71) Applicant: Mueller Environmental Designs, Inc., Houston, TX (US)

(72) Inventor: Fred J. Mueller, Houston, TX (US)

(73) Assignee: MUELLER ENVIRONMENTAL DESIGNS, INC., Houston, TX (US)

( * ) Notice: Subject to any disclaimer, the term of this patent is extended or adjusted under 35 U.S.C. 154(b) by 96 days.

(21) Appl. No.: 14/792,768

(22) Filed: Jul. 7, 2015

(65) Prior Publication Data

US 2015/0306528 A1    Oct. 29, 2015

Related U.S. Application Data

(63) Continuation-in-part of application No. 14/521,141, filed on Oct. 22, 2014, now Pat. No. 9,101,869, which is a continuation of application No. 13/250,479, filed on Sep. 30, 2011, now Pat. No. 8,940,067.

(51) Int. Cl.
| | |
|---|---|
| *B01D 45/12* | (2006.01) |
| *B01D 45/16* | (2006.01) |
| *B04C 3/00* | (2006.01) |
| *B04C 3/06* | (2006.01) |

(52) U.S. Cl.
CPC ............... *B01D 45/16* (2013.01); *B04C 3/00* (2013.01); *B04C 3/06* (2013.01); *B01D 2271/027* (2013.01); *B04C 2003/006* (2013.01)

(58) Field of Classification Search
CPC .. B01D 45/16; B01D 47/06; B01D 2257/302; B01D 2257/504; B01D 2271/027
See application file for complete search history.

(56) References Cited

U.S. PATENT DOCUMENTS

| | | | | |
|---|---|---|---|---|
| 2,582,423 A | * | 1/1952 | Foley | ......................... B04C 5/14 55/398 |
| 2,667,944 A | * | 2/1954 | Crites | ....................... B04C 5/06 55/346 |
| 3,693,329 A | * | 9/1972 | Willis | .................... B01D 45/12 138/37 |
| 3,915,679 A | * | 10/1975 | Roach | ...................... B04C 3/06 55/347 |

(Continued)

*Primary Examiner* — Dung H Bui
(74) *Attorney, Agent, or Firm* — Conley Rose, P.C.

(57) ABSTRACT

A system and methods for separating liquids, aerosols, and solids from a flowing gas stream whereby gas flows through a helical path formed in a separator element. Partially separated gas exits the bottom of the separator element at a generally conical cavity. Clean gas exits through an inner tube that is axially aligned beneath the helical path. Separated materials exit through an annular space between the inner tube and an outer tube. Separation occurs in the helical channels which include radially diverging walls to provide an aerodynamically efficient flow, in a region of high swirl created in a generally conical cavity beneath the separator element. In higher liquid-loading or slug flow conditions, a passageway may be formed in the separator element for recirculating a portion of the gas flow exiting from the bottom of the outer tube, into an axial passage in the helical separator, and exiting from the bottom of the helical separator near the vertex of the conical cavity.

10 Claims, 11 Drawing Sheets

(56) References Cited

U.S. PATENT DOCUMENTS

| | | | | |
|---|---|---|---|---|
| 4,162,906 | A * | 7/1979 | Sullivan | B04C 3/00 210/512.1 |
| 4,289,611 | A * | 9/1981 | Brockmann | B04C 3/04 209/710 |
| 4,985,058 | A * | 1/1991 | Prinsloo | B04C 3/00 55/396 |
| 6,673,133 | B2 * | 1/2004 | Sechrist | B04C 3/04 55/348 |
| 6,692,225 | B2 * | 2/2004 | Lin | B63H 11/08 114/55.56 |
| 6,902,593 | B2 * | 6/2005 | Miller | B01D 45/14 422/147 |
| 7,001,448 | B1 * | 2/2006 | West | B01D 45/16 55/413 |
| 7,503,950 | B2 * | 3/2009 | Håland | B01D 19/0063 55/315 |
| 8,226,743 | B2 * | 7/2012 | Betting | B01D 45/16 55/423 |
| 2003/0115843 | A1 * | 6/2003 | Haland | B01D 45/16 55/392 |
| 2007/0251383 | A1 * | 11/2007 | Mueller | B01D 45/16 95/216 |
| 2007/0256566 | A1 * | 11/2007 | Faber | B01D 45/08 96/417 |
| 2010/0275561 | A1 * | 11/2010 | Lundquist | B04C 3/00 55/456 |
| 2012/0103423 | A1 * | 5/2012 | Schook | B01D 45/16 137/1 |
| 2012/0111196 | A1 * | 5/2012 | Schook | B01D 17/0217 95/271 |
| 2014/0116255 | A1 * | 5/2014 | Perez Guerra | B04C 3/00 96/216 |

* cited by examiner

SWIRL HELICAL ELEMENTS FOR A VISCOUS IMPINGEMENT PARTICLE COLLECTION AND HYDRAULIC REMOVAL SYSTEM

CROSS-REFERENCE TO RELATED APPLICATION

The present application is a continuation-in-part and claims the benefit of U.S. patent application Ser. No. 14/521,141, filed on Oct. 22, 2014, which is a continuation and claims the benefit of U.S. patent application Ser. No. 13/250,479, filed on Sep. 30, 2011, entitled "Swirl Helical Elements for a Sub-Micron Viscous Impingement Particle Collection and Hydraulic Removal System," all of which are hereby incorporated by reference.

FIELD OF THE INVENTION

The present invention relates in general to systems and methods for removing liquids and particulate from flowing gas streams. More particularly, the invention relates to systems and methods for removing liquids and particulate from flowing gas streams by encapsulation of the particulate and impingement separation of the liquid and particulate. Most particularly, the invention related to helical elements generating high swirl forces used to separate liquid and particulate from flowing gas streams.

BACKGROUND

Flowing gas streams often contain particulate material that must be removed from the gas stream. The particulate material may be an undesirable contaminant in the gas stream. Alternatively, the gas stream may contain a desirable particulate material, for example, in a process for manufacturing the particulate. Similarly, flowing gas streams may contain liquids or aerosols, either desirable or undesirable, that must be removed from the gas stream.

There presently exist several systems and methods for removing particulate material and/or liquids from gas streams, including inertial, viscous, diffusion, filtration, and electrostatic separation systems and methods. These existing systems for separating solids and liquids from gas streams may be inefficient, pose unnecessary environmental hazards, and may be costly to manufacture and operate.

By way of example, a natural gas transmission company was recently experiencing a problem with its conventional filter separators at a compressor station in Louisiana. Approximately every six weeks, the compressor station was experiencing harmful slugs of lubrication oil mixed with a black powder. This mixture would coat the filters in the filter separators and compromise the elements, thus allowing the contaminated gas to flow through the separator and into the downstream compressor equipment. As a result, the compressors had to be shut down for approximately three days while personnel worked around the clock to manually change and dispose of the contaminated and potentially hazardous filter elements. Further background regarding available systems and methods may be found in the applicant's U.S. Pat. No. 7,875,103, which is hereby incorporated by reference.

U.S. Pat. No. 7,875,103 discloses a viscous impingement particle collection and hydraulic removal system. The system solves many of the problems associated with the prior art by providing a plurality of helical separators positioned in a gas flow path and connected through a sump to a duplex-filtered side stream. Each helical element is typically about 4 inches in diameter and 5 inches in height, and forms helical channels that turn a total about 180 degrees. The channels are formed by parallel fins spaced apart about 0.5625 inch, with an inner radius of about 0.28125 inch and short chamfers on the exterior edge of each fin. With typical gas flow rates, this configuration generates centripetal acceleration forces of about 1,300 G's.

Helical elements such as those disclosed in U.S. Pat. No. 7,875,103 are typically machined from a solid rod of a high grade 4130 chrome molybdenum, 304/316 stainless steel, ceramics, or other suitable material depending on the particular flow application. The complex geometry of the helical channels, inner radius, and fins may also require extensive machining and lengthy processing on a large, five-axis CNC milling machine. Thus, manufacturing each of the 100 or more helical elements often needed for a single separator may prove costly and time consuming.

Accordingly, there exists a need for new systems and methods for removing particulate and liquids from flowing gas streams wherein the new systems and methods are capable of effective operation at varying gas flow rates and potentially high liquid-to-gas weight ratios. Preferably, such systems should also be simpler and less expensive to manufacture.

SUMMARY

In brief summary, the present invention includes embodiments of systems and methods for separating and removing liquid and particulate from flowing gas streams. A flowing gas stream enters a separator vessel hydraulically connected to a waste liquid recovery tank, which may also be connected to a duplex-filtered side stream. Optionally, a liquid may be injected within the separator or upstream from the separator to encapsulate particulate and facilitate separation from the flowing gas stream.

Liquids and particulate separated from the gas stream flow by gravity and inertia into a waste liquid sump. The sump may drain into a waste liquid recovery tank which may include a duplex-filtered side stream circuit. The side stream circuit reintroduces filtered liquid back into the tank so that the filtered liquid may be re-injected in a continuous loop.

The separator may be a vertically oriented helical separator. Coaxial inner and outer tubes provide a flow path for the gas stream and liquid path open to the sump. The helical separator may be positioned within and near the top of the outer tube, and includes a plurality of adjacent separator fins that extend radially outward to form a plurality of helical channels. The distance between adjacent fins generally increases with the distance from the central axis of the helical element in order to provide a larger flow path area and increase aerodynamic efficiency. Chamfers may also be provided on a distal vertical edge of the fins and a generally rounded radius may be provided between adjacent fins.

The helical channels may be arranged around the helical separator to form a circular pattern having a diameter larger than the diameter of the clean gas tube. The helical channels may turn a total of about 90 degrees with a rotational pitch of about 41 degrees and provide a total channel area exceeding the area of the inner or clean gas tube. Further, the lower end of the separator may also form a generally conical cavity. Thus, a flowing gas stream may be directed through the helical channels and exit through the conical cavity to facilitate the generation of desirable regions of high swirl that facilitate separation.

The separator may also include a passageway for recirculating a portion of the gas flow from the bottom of the outer tube, into an axial passage in the helical separator, and exiting from the bottom of the helical separator near the vertex of the conical cavity. Low pressure near the vertex of the conical cavity facilitates increased flow through the annular space between the inner tube and the outer tube, which, in turn, facilitates the flow of separated liquids in higher liquid-loading or slug flow conditions.

As discussed in more detail below, in comparison to most previous separator designs, embodiments of the particle collection and hydraulic removal system of the present invention require simpler and less frequent maintenance and cleaning, with fewer operational interruptions, and produces less potentially hazardous waste products.

As is also discussed below, the particle collection and hydraulic removal system of the present invention provides for a highly efficient gas flow and includes predictable regions of high swirl flow which are very effective at removing large volumes of liquid and particulate. The efficient gas flow and predictable regions of high swirl enable the use of a helical design with a scalable geometry which is adaptable to a wide variety of gas stream flow rates and particulate/liquid loading densities.

Advantageously, the helical elements also require less raw materials and are simpler to manufacture than helical elements employed in existing systems, while still providing a significant increase in separation efficiency.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Particle Collection and Hydraulic Removal System and Method

Figure 1:
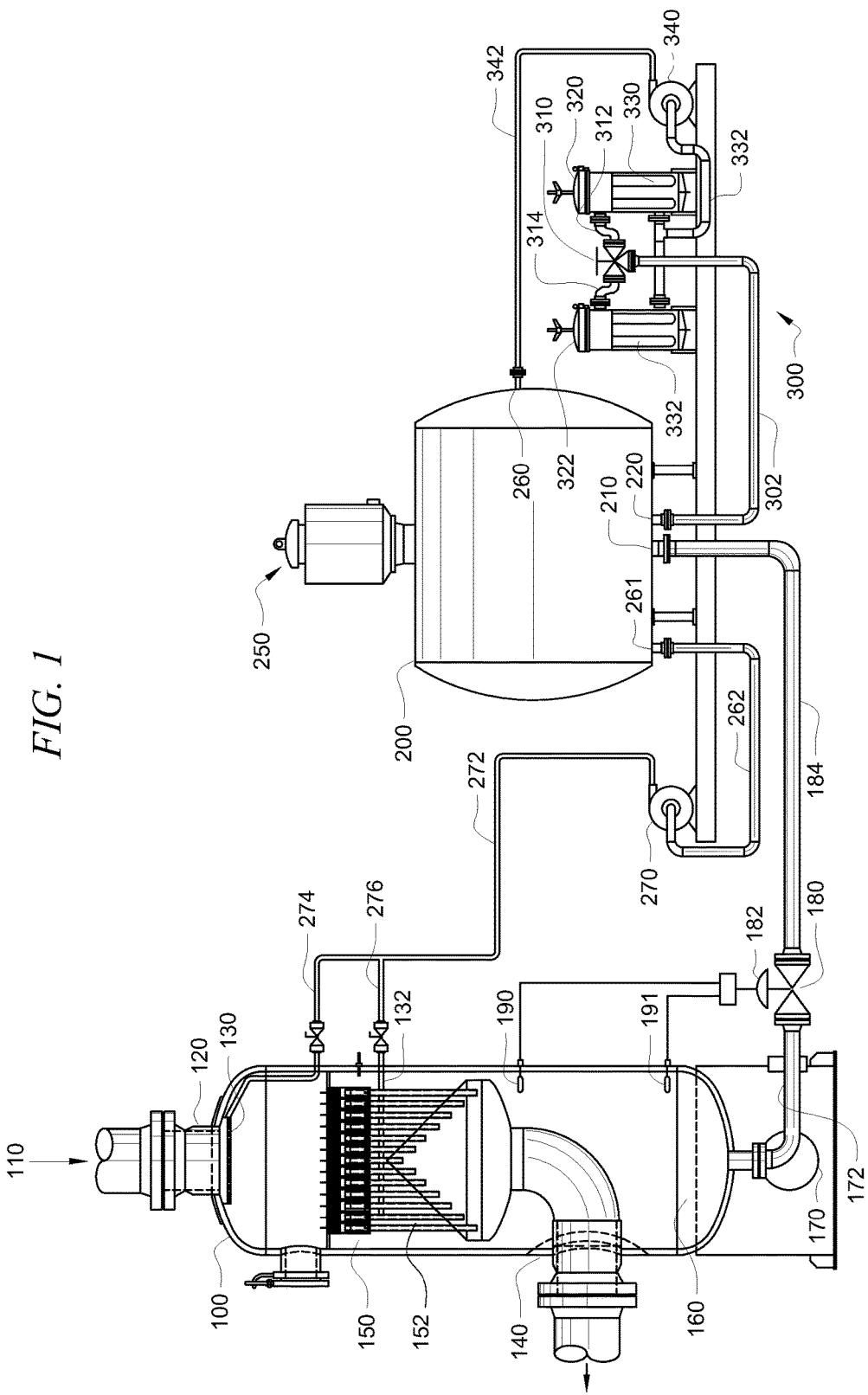
FIG. 1 is a cross section side view of an embodiment of the particle collection and hydraulic removal system of the present invention arranged for separating particulate and liquids from a flowing gas stream.
Figure 2:
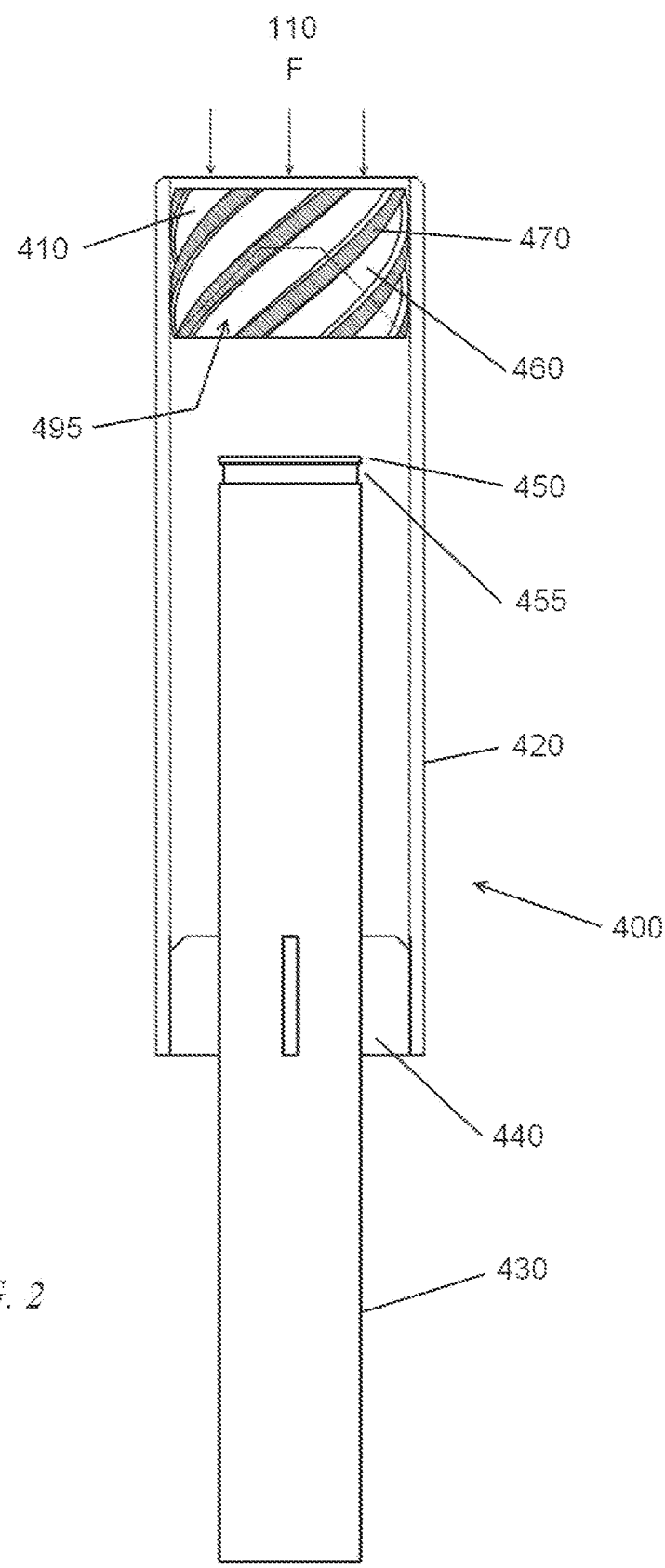
FIG. 2 is a cut-away side view of an embodiment of a helical separator of the present invention.

FIG. 1 illustrates an embodiment of a particle collection and hydraulic removal system adapted for separating solid particulate and liquids from flowing gas streams. In general, the system includes a separator vessel 100 hydraulically connected to a waste liquid recovery tank 200 and a duplex-filtered side stream 300.

A flowing gas stream 110 may contain particulate and/or liquid that must be removed. By way of example, gas stream 110 may be a stream of pressurized natural gas flowing through a natural gas distribution system. For such an application, the particle collection and hydraulic removal system may be located in or near natural gas compressors, dehydration equipment, glycol contactor towers, or gas measurement equipment. The system may also be employed during pipeline pigging operations. In this manner, solids and liquids may be removed from the gas stream 110 before it enters the gas compressors or other equipment, where it would otherwise damage or degrade the efficiency of the equipment. In such an application, the particle collection and hydraulic removal system may optionally include a separator vessel 100 for each natural gas compressor, and a waste liquid recovery tank 200 for every two separator vessels 100. Those skilled in the art would recognize that, for this particular application or other similar applications, different combinations of separator vessels 100 and recovery tanks 200 may be employed with equal success depending on the various requirements of the particular application.

In FIG. 1, separator vessel 100 is depicted as a vertically-oblong cylindrical tank, but those skilled in the art would recognize that vessel 100 may be any closed vertical container with a height sufficient to enclose the internal components, as described more fully below, or a closed horizontal container with sufficient length to enclose the internal components (not shown). Vessel 100 includes a gas inlet 120 where the flowing gas stream 110 enters the vessel 100. Vessel 100 also includes a gas outlet 140 where the gas stream 110 exits the vessel after separation of the liquids and particulate.

After gas stream 110 enters at inlet 120, a liquid may be injected into the gas stream by injector 130, for example, by a plurality of holes or nozzles (not shown) in conduit 274. For these applications, the injected liquid encapsulates solid particles within the gas stream 110. Mineral oil, compressor lubricating oil, glycol, hydrocarbon condensate, and similar liquids may be used as the injection liquid, depending on the particular requirements of the application. For example, the injection liquid may be Crystal Plus 70T light viscosity white mineral oil available from STE Oil Company, Inc., of San Marcos, Tex.

Vessel 100 also includes a mechanical separator. FIG. 1 depicts separator 150 located downstream from injector 130 and upstream from gas outlet 140. Separator 150 is preferably a high-swirl helical separator 400 as more fully described in FIGS. 2-6 and the accompanying text. Separator 150 provides for separation of solids, liquids or aerosols, and solids encapsulated within liquids from the gas stream 110.

A second stage of liquid injectors, for example injectors 132, may be employed downstream from injectors 130 to more fully encapsulate particulate in the gas stream 110. In FIG. 1, injectors 132 inject liquid directly into the separator 150 through conduit 276.

Solids, liquids, and solids encapsulated within liquids separated from the gas stream 110 drop out from the gas stream 110 by gravity and inertia, and fall into sump 160 located at the bottom of vessel 100. During operation, the sump 160 fills with waste liquid until the waste liquid level activates switch 190. Switch 190 then sends a signal to actuator 182, which opens sump valve 180. Gravity and the internal pressure within vessel 100 may then drain the waste liquid from sump 160 through conduits 172 and 184, until the waste liquid level falls below the level of switch 191. Switch 191 then sends another signal to actuator 182, which closes sump valve 180. Alternatively, if needed for low gas stream pressures or for other applications, a sump pump 170 may be used to pump waste liquid from sump 160. In this manner, a level of waste liquid is always maintained in the sump to prevent the escape of any gasses from gas stream 110 through the sump. Thus, the portions of the particle collection and hydraulic removal system downstream from the sump 160 need not be maintained at high internal pressures.

Waste liquid removed from sump 160 then travels through conduits 172 and 184, through outlet 210, and into to recovery tank 200. Recovery tank 200 collects waste liquid for removal, or for filtering and re-injection. In order to permit re-injection of waste liquid, a side stream of waste liquid is drained from recovery tank 200 at outlet 220 during operation. The waste liquid travels through conduit 302 and into a side stream filtration system, preferably, a duplex filtration system.

The duplex filtration embodiment depicted in FIG. 1 includes a three-way valve 310 which selectively directs waste liquid from recovery tank 200 into one of filter vessels 320 and 322. Vessels 320 and 322 preferably include bag-type filter elements or other replaceable filter means that can be easily removed and discarded or cleaned. In the preferred embodiment, pump 340 draws waste liquid through a plurality of filter elements (filters 330 or filters 332) in the selected filter vessel (either vessel 320 or vessel 322, respectively). Pump 340 extracts filtered liquid from the selected filter vessel through conduit 332, and then pumps the filtered liquid through conduit 342 and into recovery tank 200 at inlet 260. Pump 340 preferably maintains a flow volume through side stream 300 which is greater than the flow volume into the recovery tank 200, so that the liquid in recovery tank 200 remains clean and there is no need for additional mechanisms to segregate clean liquid from waste liquid. In a preferred embodiment, pump 340 maintains a flow rate of filtered liquid of at least 5-6 times the flow rate of waste liquid entering sump 160.

The varying flow rates entering the recovery tank 200 at inlets 210 and 260, and exiting the recovery tank 200 at outlets 220 and 261 may cause a fluctuation of the liquid level in recovery tank 200. Thus, recovery tank 200 preferably also includes a filter vent 250 or vapor recovery system (not shown) to maintain near atmospheric pressure during liquid level fluctuations.

After a period of operation, the filters 330 in the currently selected vessel (filters 330 in vessel 320, or filters 332 in vessel 322) will require replacing, which is typically indicated by a higher than expected pressure drop. When this occurs, the three-way valve 310 may be switched to select the other of vessels 320 and 322. The de-selected vessel may then be opened to simply replace or clean filters 330. Here, the de-selected vessel may be opened to the atmosphere for replacing the filters without expelling or leaking waste liquid, or exposing personnel to hazardous gasses. Thus, unlike most prior systems, the present particle collection and hydraulic removal system need not be bypassed or taken off line for periodic filter replacement, and personnel need not take extraordinary environmental precautions to guard against exposure to potentially harmful substances.

Lastly, filtered liquid (e.g., mineral oil) is drawn out from recovery tank 200 at outlet 261 and through conduit 262 by pump 270. Pump 270 also delivers filtered liquid through conduits 272, 274, and 276 into vessel 100 for re-injection into the gas stream 110. In this manner, waste liquid is removed from gas stream 110, filtered, and returned for reuse in a substantially continuous closed-circuit.

Helical Separator Element

The mechanical separator 150 illustrated in FIG. 1 is preferably a plurality of tightly-spaced and vertically oriented helical separators, such as the high-swirl helical separator 400 depicted in FIG. 2. Unlike a traditional swirl tube, which uses vanes to force the gas stream to turn and create swirl, embodiments of the present invention use helical gas flow paths with a geometry chosen to prevent flow separation. As discussed below, the cross-section of the helical gas flow paths, their turning angle, and their axial pitch all cooperate to generate swirl without a loss of aerodynamic efficiency. In addition to being a centrifugal type separator, embodiments of the present invention are also an impingement type separator. As liquids enter the helical gas flow path, liquid aerosols impinge and coalesce on the walls of the flow paths. This aerodynamically efficient flow tends to retain the impinged liquids on the walls of the channels, forming a film that helps to improve the separation efficiency.

In FIG. 2, helical separator 400 includes helical element 410 secured within and at the top of a generally cylindrical outer; tube 420. Generally cylindrical inner tube 430 has a smaller outer diameter than inner diameter of outer tube 420, and is vertically spaced a short distance below helical element 410, for example, 2 inches below helical element 410. The lower portion of inner tube 430 is retained and centralized within outer tube 420 in part by vertically oriented fins 440.

In FIG. 2, the flow direction of gas stream 110 (also depicted in FIG. 1) is generally illustrated with arrow F. The gas stream 110 is directed into the top of helical element 410, which is surrounded by outer tube 420. A plurality of channels 460 and diverging fins 470 (better illustrated in FIG. 4) are formed in a circular pattern around the exterior of helical element 410. The channels 460 and diverging fins 470 wind clockwise from the top to the bottom of helical element 410 and, when surrounded by outer tube 420, form a plurality of helical gas flow paths.

As the gas stream 110 flows downwardly through the helical flow path provided by channels 460, fins 470, and outer tube 420, the gas stream 110 impinges on the walls 472 of fins 470 and the inner walls of outer tube 420, and begins to rotate clockwise (as seen from above). Particulate and liquids carried within the gas stream 110 have greater density than the gas stream 110, and a corresponding higher kinetic energy. As discussed in more detail below, the helical gas flow path formed by channels 460, fins 470, and outer tube 420 provides a highly efficient gas flow with roughly equal axial and tangential velocity components. Thus, particulate carried within the gas stream 110 impinges on the interior surface of channels 460, fins 470, and outer tube 420, and becomes further encapsulated within the liquid. Liquid vapor and smaller liquid droplets in the gas stream 110 likewise impinge on the walls of the helical flow path and coalesce to form larger liquid droplets and liquid streams or sheet flow, particularly on the lowermost walls of fins 470.

Similarly, when the gas stream 110 begins to rotate clockwise in the helical flow path, the increased angular velocity of the gas stream 110 creates centrifugal forces. The centrifugal forces have a greater effect on the particulate and liquids in the gas stream 110, thereby causing coalescence and encapsulation on the inside wall of outer tube 420. Thus, coalescing liquid droplets, liquid streams, and encapsulated particulate form larger liquid streams flowing in sheet flow downwardly along the walls of fins 470 and along the inside wall of outer tube 420. The sheet flow traveling downwardly along the inside wall of outer tube 420 continues flowing downwardly to the bottom of outer tube 420, where it flows into the annular space formed between the outer tube 420 and the inner tube 430, and then into the sump 160 (depicted in FIG. 1). Any sheet flow remaining on the walls of fins 470 exits the bottom of helical element 410 and also preferably flows into the sump 160.

As discussed in more detail below, a preferred configuration of helical element 410 is about 4 inches in diameter and 2.5 inches high, with 8 channels 460 and 8 diverging fins 470 that turn a total of about 90 degrees. Thus, the height of the helical element 410 is about 62.5 percent of its diameter. The walls of fins 470 preferably diverge from the central axis of the helical element 410 to form an angle α of about 22 degrees. This provides a larger width between adjacent distal ends of fins 470 and a greater cross-sectional area for the helical flow path. With typical gas flow rates, this configuration generates centripetal acceleration forces of about 6,800 G's with a Reynolds number in the range of $0.68 \times 10^4$ to $4.4 \times 10^4$.

Figure 6:
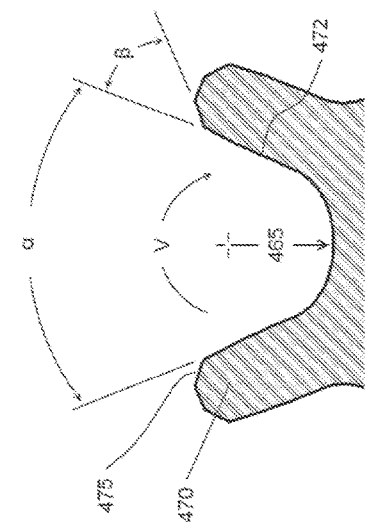
FIG. 6 is a partial cross section angled view along line 6-6 of the embodiment depicted in FIG. 3.
Figure 3:
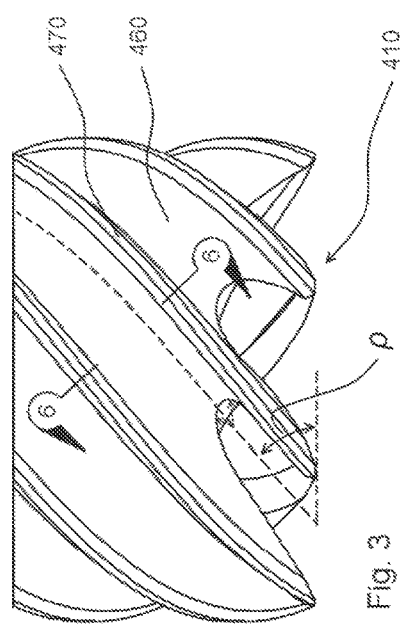
FIG. 3 is a side view of a helical element of the embodiment depicted in FIG. 2.

As indicated by the flow arrow V in FIG. 6, the gas stream 110 flowing through helical element 410 also forms a secondary vortex rotating clockwise when viewed generally from the top along line 6-6 (FIG. 3). Embodiments of the present invention are adapted to address these vortices in order to facilitate impingement separation specifically near the inner wall of outer tube 420, where liquids exiting the bottom of helical element 410 are more likely to flow into the sump. These embodiments are also adapted to minimize any disruption of the vortices near the surface of channel 460, and thereby minimize the risk that liquids may become re-entrained upon exiting the bottom of helical element 410.

Figure 5:
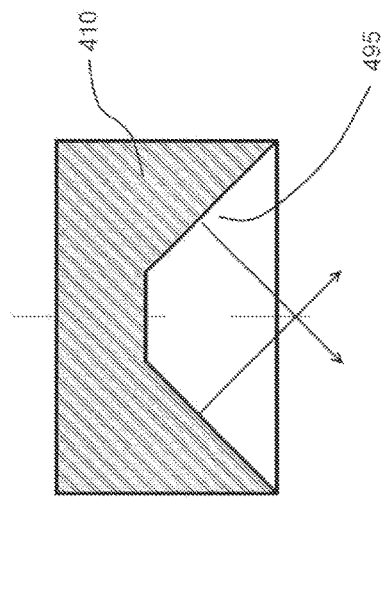
FIG. 5 is a cross section side view along line 5-5 of the embodiment depicted in FIG. 4.
Figure 4:
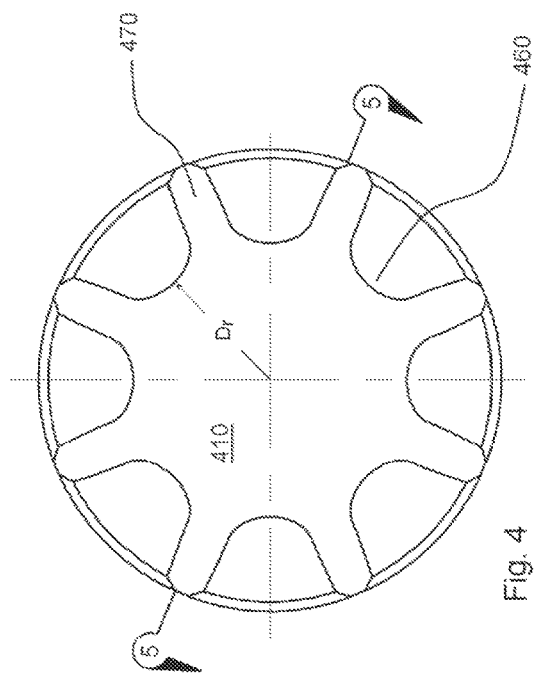
FIG. 4 is a cross section top view of the embodiment depicted in FIG. 3.

A preferred embodiment includes several means to address these secondary vortices and prevent liquid re-entrainment. As shown in FIGS. 4-6, the intersection of the channels 460 and the walls 472 of fins 470 forms a generally semi-circular, interior radius 465. In a preferred configuration, the radius 465 may be about 0.2817 inch. The radius 465 inhibits liquid separation in the secondary vortices on what would otherwise be square corners formed at the intersection of the channels 460 and the walls 472 of fins 470.

Additionally, relatively small chamfers 475 are formed along the vertical exterior edges of fins 470. In a preferred configuration, chamfers 475 may be formed at an angle β of about 34 degrees measured from the walls of fins 470, and have a length of about 0.0992 inch. When helical element 410 is fitted tightly within outer tube 420, the chamfers 475 form small pockets that act as additional vane-type separators oriented to remove liquids and particulate from the secondary vortices. In this manner, coalesced liquid streams are more effectively directed away from channels 460 and are trapped in a vertical pocket formed between the chamfers 475 and the inner wall of outer tube 420. The liquid streams flowing downwardly along the inner wall of outer tube 420 are also thereby less prone to re-entrainment within the gas stream 110. The use of chamfers 475 has been shown to significantly increase the effective liquid removal rate over non-chamfered edges under typical conditions.

In a preferred configuration including chamfers 475, the straight portion of the walls of fins 470 is approximately 0.5 inch in length and the radius 465 is located at a distance $D_r$ of about 1.1875 inches from the central axis of the helical element 410. Thus, the channels 460 are disposed radially in a circular pattern having a diameter of 2.375. Consequently, gas flow exits the bottom of helical element 410 at a radius larger than that of the opening for clean gas provided by inner tube 430, which typically has a diameter of slightly less than two inches and a radius of slightly less than one inch. It is believed that this configuration significantly increases the separation efficiency of helical elements 410.

This preferred geometric configuration of helical element 410 also provides a total open area of each channel 460 of about 0.4867 square inch. For 8 channels as typically used on a 4 inch diameter helical element 410, this provides a total gas flow path area of about 3.8936 square inches. By comparison, a typical 2 inch diameter inner tube 430 provides an open area for clean gas flowing through the system of about 2.95 square inches.

Thus, it has been found that using fins 470 with walls that diverge radially from the central axis of the helical element 410 provides for a combined flow path area through helical element 410 which exceeds the flow path area for clean gas through the inner tube 430. It is believed that radially diverging walls 470, which help provide this larger flow path area without locating the radius 465 inside the diameter of the inner tube 430, contributes significantly to the aerodynamically efficient flow observed through helical separator 410.

The radius, turning angle and cross-section of the helical gas flow paths also provide a rotational pitch angle ρ (FIG. 3) which contributes to the aerodynamic efficiency of gas flow through the helical element 410. Here, the rotational pitch angle ρ is very similar to what is commonly referred to as the "helix angle," which is typically determined by taking the inverse tangent of the quotient of the mean helical circumference divided by the helix lead (the axial distance required for one complete helical rotation), i.e.:

Helix angle=$\tan^{-1}(2 \cdot \pi \cdot r_m/\text{lead})$, where $r_m$ is the mean radius of the helix.

However, because embodiments of the present invention may use a more complex helical channel cross-section, the calculation of rotational pitch angle ρ is simplified by using the radius measured from the centroid of helical element 410 to the center of rounded radius 465 (FIG. 6), as opposed to the "mean" radius. Here, helical channels 460 using the cross-section geometry discussed above, which turn 90 degrees in 2.5 inches (or 360 degrees in 10 inches), provide a rotational pitch angle ρ of about 41 degrees. Stated differently, helical channels 460 that turn 90 degrees with a rotational pitch angle ρ of about 41 degrees require that the height of the helical element 410 be about 2.5 inches.

As discussed in more detail below, this geometric configuration of the helical gas flow path provides for a gas flow with roughly equal axial and tangential velocities. In turn, this contributes to a flow pattern through helical element 410 with very similar velocity, pressure, and swirl patterns throughout the length of channels 460. This provides for very predictable flow characteristics and contributes to high separation efficiencies throughout a wide range of gas flow rates.

The spiraling of the gas caused by the geometry of the helical gas flow path creates a leading and trailing edge at the helical inlet, thereby creating different inlet conditions for two counter rotating vortex legs. This creates an inlet vortex condition typically associated with irrotational flow. However, the trailing vortex rotates opposite of the inlet vortex. The opposite rotation of these two vortices forces all contaminants towards the walls of the helical gas flow path. This creates a sheet of liquid on the walls that will entrap small aerosols and carry them to the outlet of the helical gas flow path.

However, a trailing vortex is also formed at a small distance below the helical gas passage inlet and travels opposite of the process gas flow. In order for the trailing vortex to exist, the gas following the process flow path must change direction. This abrupt change in direction enhances separation by abruptly changing the flow direction and causing disengagement.

As shown in FIG. 5, helical element 410 also includes an interior conical cavity 495 formed at the bottom end of helical element 410. The surface of the cavity 495 generally forms a 45 degree angle to the central axis of helical element 410. The tip of the conical cavity 495 may be truncated so that the cavity 495 extends axially about 1.5 inches into the bottom of helical element 410. When liquid streams flowing in channels 460 and along the walls of fins 470 exit the bottom of helical element 410, the liquid streams tend to exit at a tangent to the bottom surface of helical element 410. Conical cavity 495 acts to direct these exiting liquid streams perpendicularly to the surface of the cavity and toward the interior surface of outer tube 420, as indicated by the flow arrows in FIG. 5. As discussed in connection with the CFD analysis below, the geometry, spacing, and area of the helical channels 460, radially diverging fins 470, cavity 495, and inner tube 430 act to create regions of high swirl directly beneath the helical element 410. In addition, toroidal vortices formed in the annular space between inner tube 430 and outer tube 420 act to maintain sheet flow along the interior surface of outer tube 420. Vertical fins 440 act to disrupt any remaining gas vortices within the annular space formed between outer tube 420 and inner tube 430, and thereby further prevent or reduce liquid re-entrainment.

Inner tube 430 may also include a small rim lip 450 at the top end facing the bottom of helical element 410, and a recessed channel 455 formed below the rim lip 450. Vortices and gas flow within the annular space formed between outer tube 420 and inner tube 430 may cause a sheet flow of liquid on the exterior of inner tube 430. This sheet flow may undesirably creep upward against the force of gravity. The recessed channel 455 and rim lip 450 disrupt this creeping flow and prevent it from passing over the top rim of inner tube 430, where the creeping flow might otherwise be re-entrained within the gas stream 110.

CFD Analysis of the Helical Separator Element

An analysis using computational fluid dynamics (CFD) was performed using a model of an exemplary embodiment of the helical separator element 410 as shown in FIGS. 2-6 and described above. A mesh of 750,000 elements was used with smaller mesh elements located inside the helical channel flow path and in the concave conical cavity 495 near the bottom of the helical element 410. A larger mesh size was employed inside the inner tube 430 and in the annular space formed between the outer tube 420 and inner tube 430. A gas flow of air was simulated under steady conditions at standard temperature and pressure (STP) at flow rates of 1.567, 3.917, 6.267, 8.617, and 10.967 pounds per minute. The analysis used a realizable k-ε turbulence model to capture swirling flow with a second-order differencing scheme.

Figure 7:
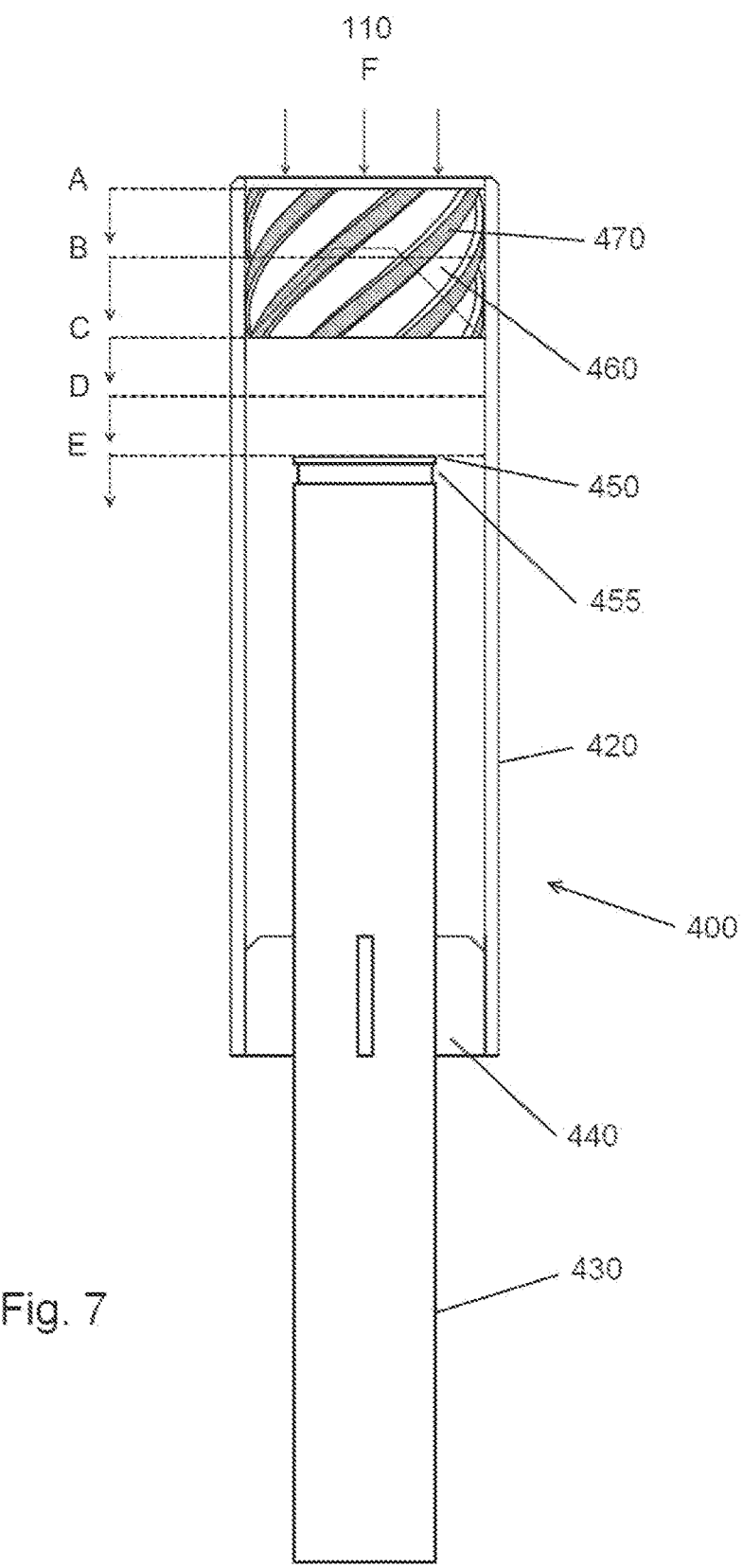
FIG. 7 is a cut-away side view of the embodiment depicted in FIG. 2 showing the location of planes A-E used for CFD analysis.

The analysis examined velocity, pressure, and flow lines at horizontal planes A, B, C, D, and E shown by dashed lines in FIG. 7. Planes A-E were located at the upstream entrance of the helical flow path, at half way between the entrance and the exit at cavity 495, at the exit at cavity 495, half way between the exit and the top of inner tube 430, and at the top of inner tube 430. Results are summarized below.

The analysis first examined velocity vectors in the planes A-E. Velocity vectors in the plane A immediately above the entrance to separator elements 420 were shown to gradually increase to a concentration near point 510 shown in FIG. 8. Velocity vectors in the plane A just inside the entrance to separator elements 420 increased to a concentration near point 520. While the general magnitude of velocity vectors increased with higher flow rates, the overall pattern of velocity vectors remained nearly unchanged.

Similarly, velocity vectors in the plane B half way between the entrance and exit of separator elements 420 were shown to more dramatically increase, with higher velocities becoming more concentrated near point 520. Again, the pattern of velocity vectors remained nearly unchanged with increases in flow rate (with the general magnitude increasing with higher flow rates). As indicated by point 520, velocities were higher toward the trailing surface of the channels 460 and lower toward the leading surface. The analysis indicated that the helical flow path formed by channels 460, diverging fins 470, and outer tube 420 established an aerodynamically efficient flow at all gas flow velocities, without the presence of flow separation or flow reversal.

CFD analysis also showed that velocity vectors in the plane C at the exit of channels 460 on the surface of cavity 495 formed a dramatic swirling vortex core indicated with velocity vectors 530 on the inside of cavity 495. Velocity vectors in the plane D half way between the exit and the entrance to inner tube 430 showed a similar swirling vortex core pattern, but expanded radially toward the outer tube 420. As before, with varying flow rates, the peak velocity generally increased, but the velocity patterns at each respective plane C and D remained nearly unchanged.

Figure 9:
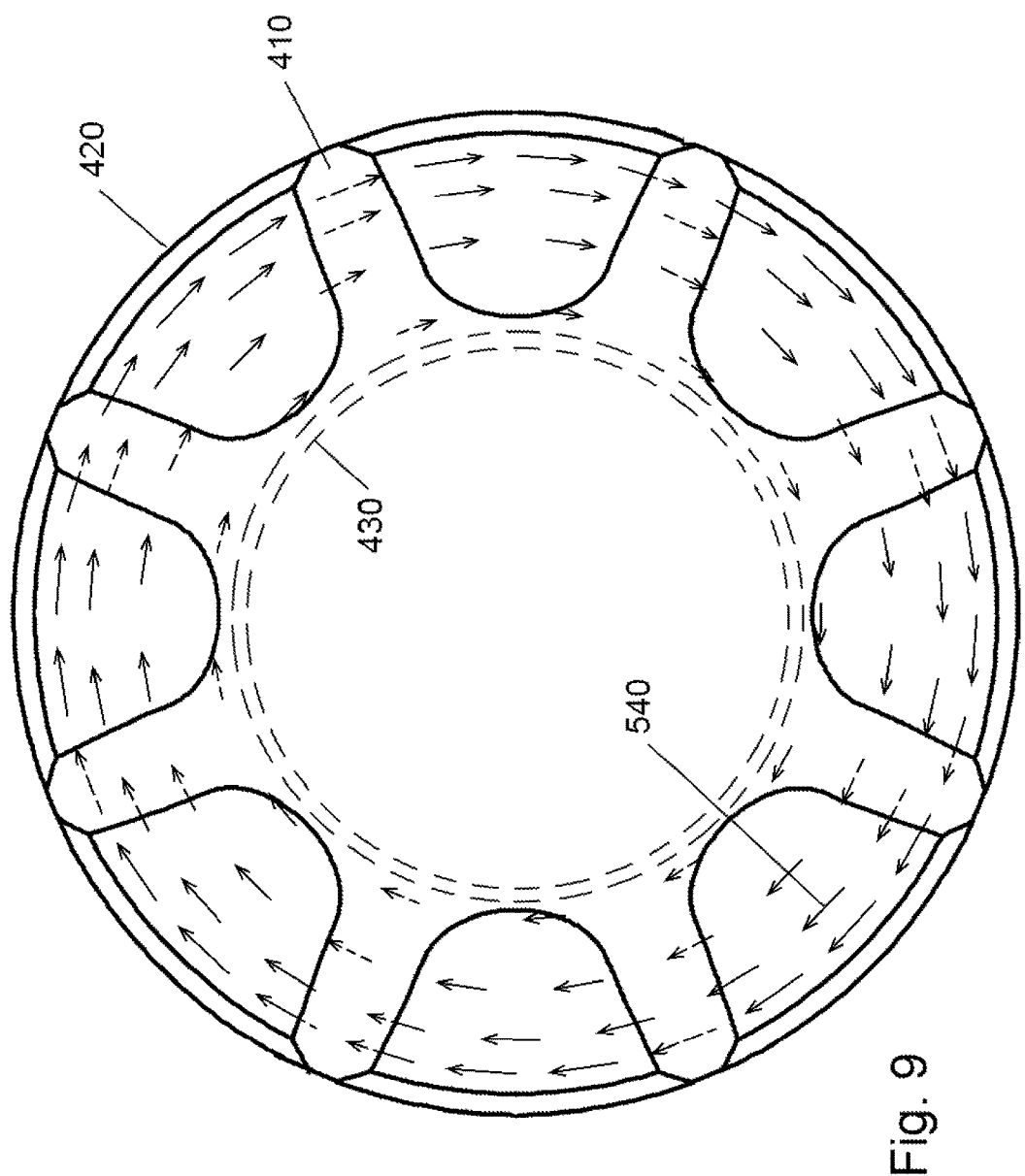

As shown in FIG. 9, velocity vectors in the plane E at the top of inner tube 430 (indicated with velocity vectors 540) show that the high swirl region migrated from inside the cavity 495 to occupy the annular space between the inner tube 430 and the outer tube 420. Although not depicted in FIG. 9, a region of much lower velocity swirling flow was also shown on the inside of inner tube 430. Again, the swirling flow velocity generally increased with the flow rate, but the direction of swirling flow vectors generally remained the same at all flow rates.

Figure 10:
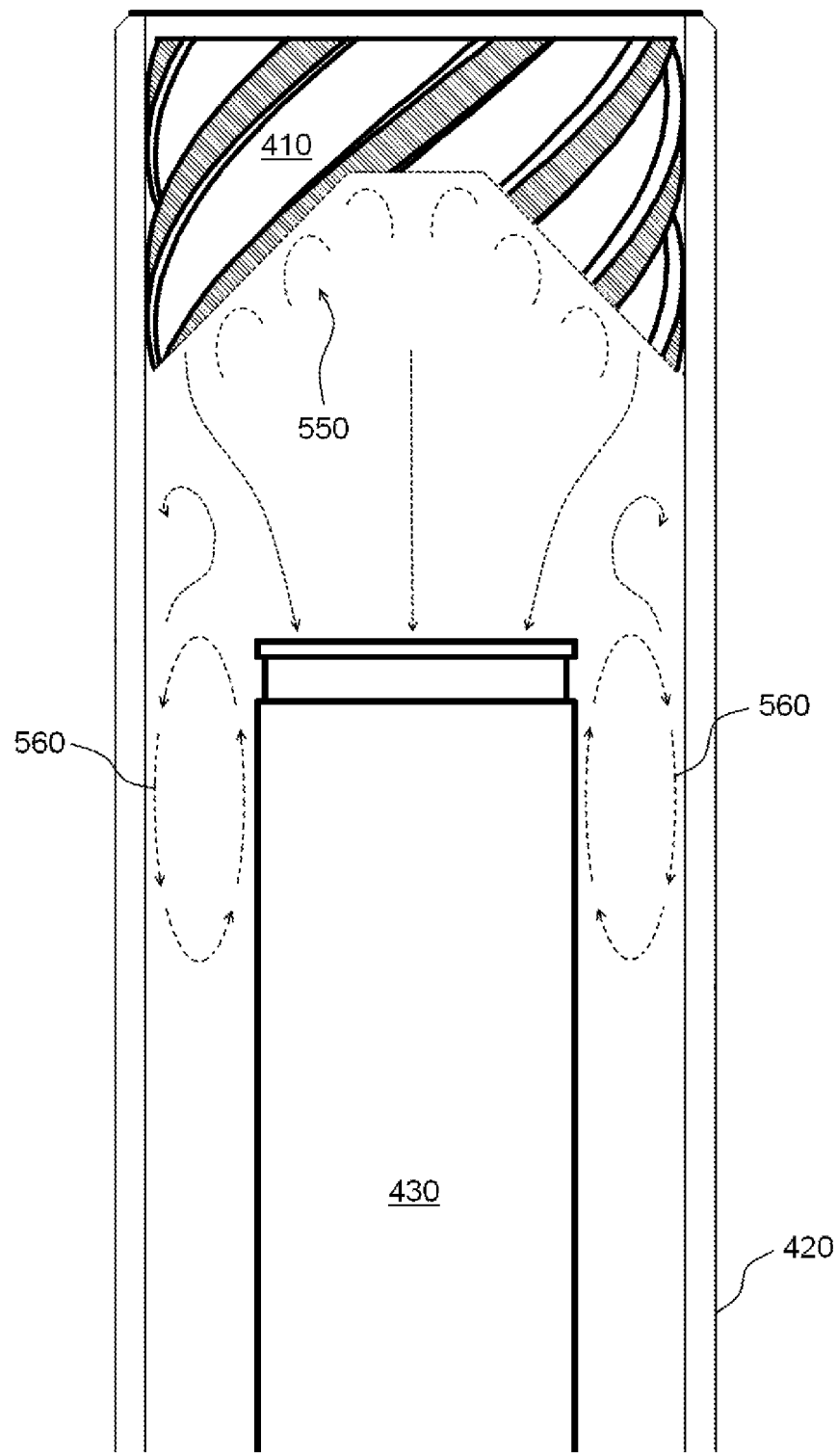
FIGS. 10 and 11A are cross section side views of the embodiment depicted in FIG. 7, with a portion of the helical element cut away to show the results of CFD analysis.

Much like the consistent flow vectors observed for varying flow rates at each of the horizontal planes A-E, pressure contours on a vertical plane through the center of the helical separator 400 had a very similar distribution at varying flow rates, with only peak pressures increasing with an increased flow rate. As shown in FIG. 10, vortices 550 formed in the cavity 495 at the bottom of helical element 410, and toroidal vortices 560 formed in the annular space between the inner tube 430 and the outer tube 420. The pattern of pressure contours in the vertical plane also remained nearly constant for all flow rates used in the model.

It is believed that the toroidal vortices 560 greatly enhance separation efficiency. The gas flowing near the boundary layer on the inside of outer tube 420 travels below the clean gas inlet, i.e., below the lip 450 shown in FIG. 2. This is due to the inertial forces acting on the gas molecules. The gas will continue to travel below the inlet of inner tube 430 until the force created by the low pressures closer to the outlet at fins 440 is larger than the inertial force pushing the gas down. Once this occurs, the gas changes direction and travels upwards along the outside of the inner tube 430. As the gas reaches the inner tube 430, it forms two path lines: one entering the clean gas tube and the other returning to the boundary layer on the inside surface of outer tube 420. As the gas returns to the boundary layer, the path lines form closed loops and produce a donut-shaped region of vorticity that may be referred to as a toroidal vortex ring.

CFD analysis showed that this toroidal vortex ring generates a downward flow along the inner surface of the outer tube 420 and an upward flow along outer surface of the inner tube 420. When the liquids, aerosols, or particulate are pushed toward the outer tube 420 in the swirl region, inertial forces push them toward the toroidal vortex. The toroidal vortex pushes the material down into the annular space between the inner tube 430 and outer tube 420. When the lower pressure beneath the inlet of inner tube 430 overcomes the inertial force, the gas will change direction sharply and flow upward along the outside of inner tube 430. This sharp change in direction causes the liquid, aerosols, and particulate in the toroidal vortex to disengage from the gas stream and flow into the sump 160 (FIG. 1).

Figure 8:
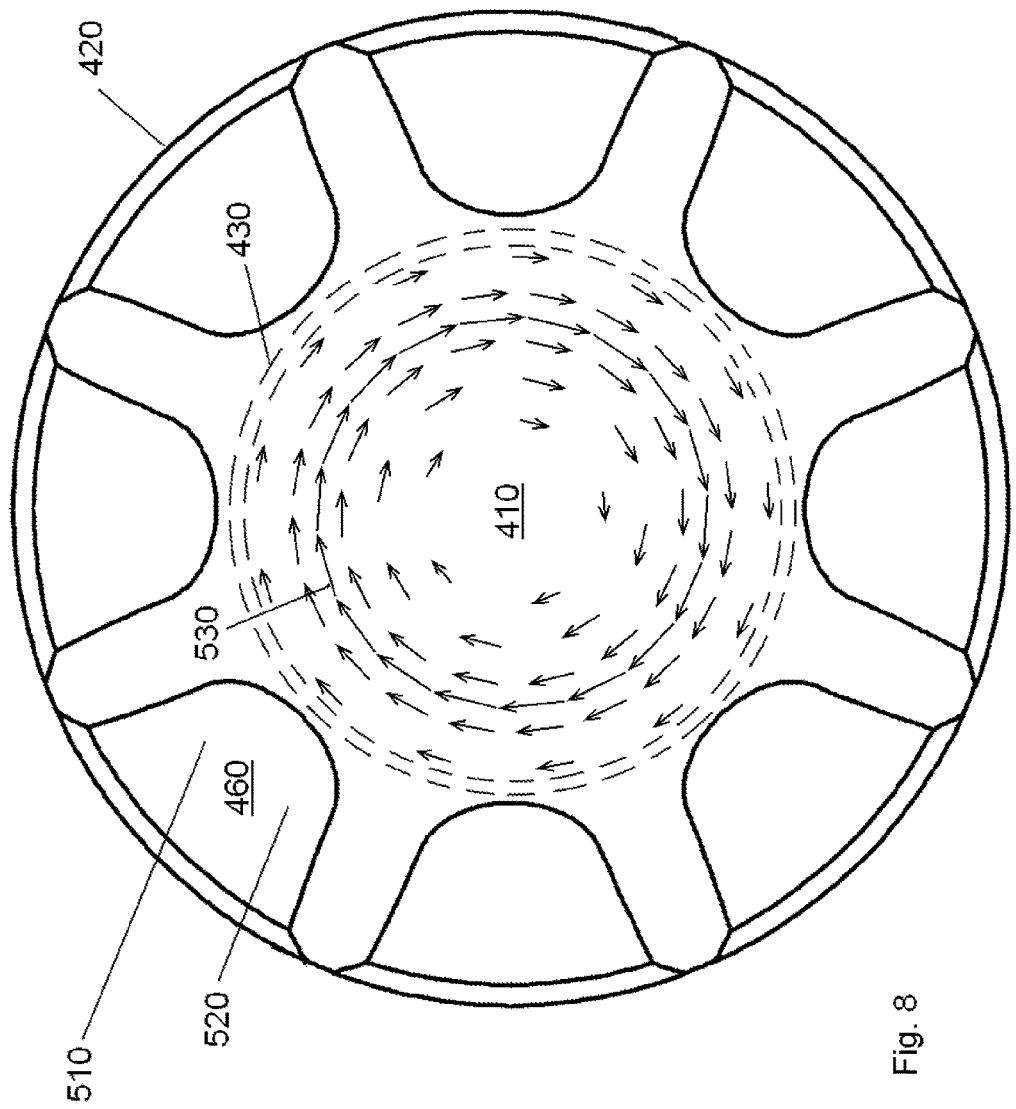
FIGS. 8 and 9 are a cross section top views of the embodiment depicted in FIG. 4 showing the results of CFD analysis at planes A and E from FIG. 4.
Figure 11C:
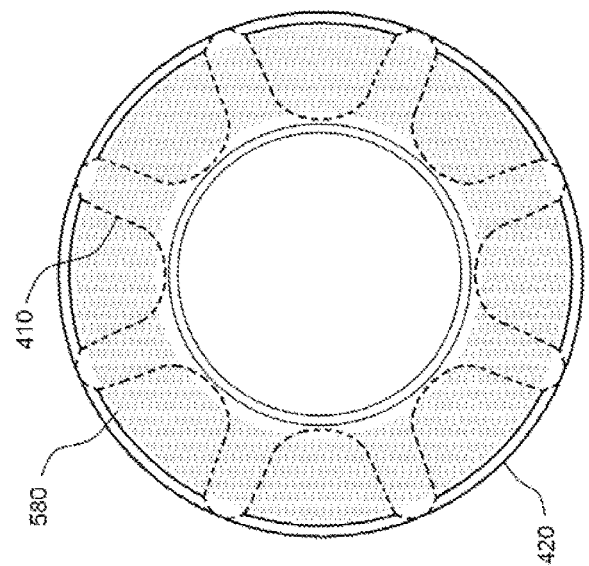
FIGS. 11B and 11C are cross section top views along the lines 7 and 8 in FIG. 11A with hidden lines depicting the helical element, and which show the results of CFD analysis.
Figure 11A:
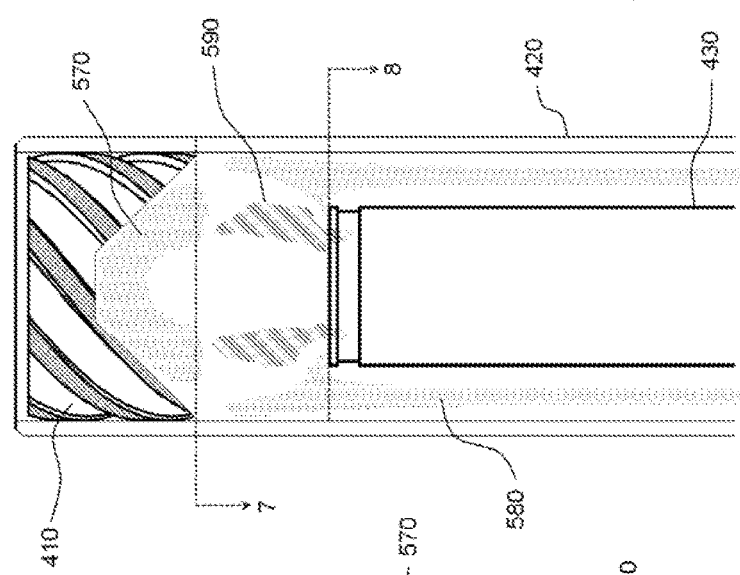
Figure 11B:
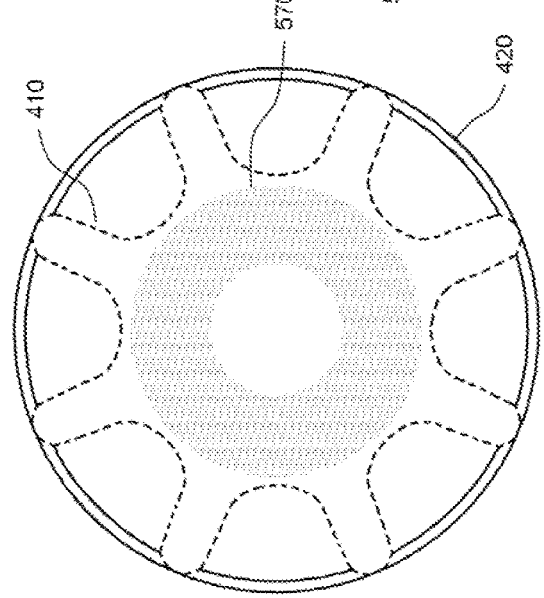

The CFD model more closely examined this swirling flow throughout the device by computing the swirl angle in both the vertical plane (as generally illustrated in FIG. 10), and in the horizontal planes A-E illustrated in FIGS. 7-9. Here, the swirl angle was defined as the arc-tangent of the ratio of the tangential flow velocity divided by the axial flow velocity. Thus, a swirl angle approaching 90 degrees would indicate a predominantly tangential flow and negligible axial flow, a swirl angle approaching 0 degrees would indicate a predominantly axial flow, and a swirl angle of 45 degrees would indicate equal tangential and axial flow velocities. As shown in FIGS. 11A and 11B, an area 570 of high swirl angle approaching 90 degrees was shown in the cavity 495, and as shown in FIGS. 11A and 11C, another area 580 of high swirl angle approaching 90 degrees was shown in the annular space between the top of the inner tube 430 and the outer tube 420. An area 590 of high swirl velocity (tangential flow velocity) was shown in the region between the bottom of cavity 495 and near the top of inner tube 430. Although not shown in FIG. 11, the swirl angle remained relatively constant at about 45 degrees throughout the helical passages, indicating an aerodynamically efficient flow. The swirl angle pattern and swirl velocity pattern were both nearly the same at all flow rates, with higher velocities at higher flow rates.

Figure 12:
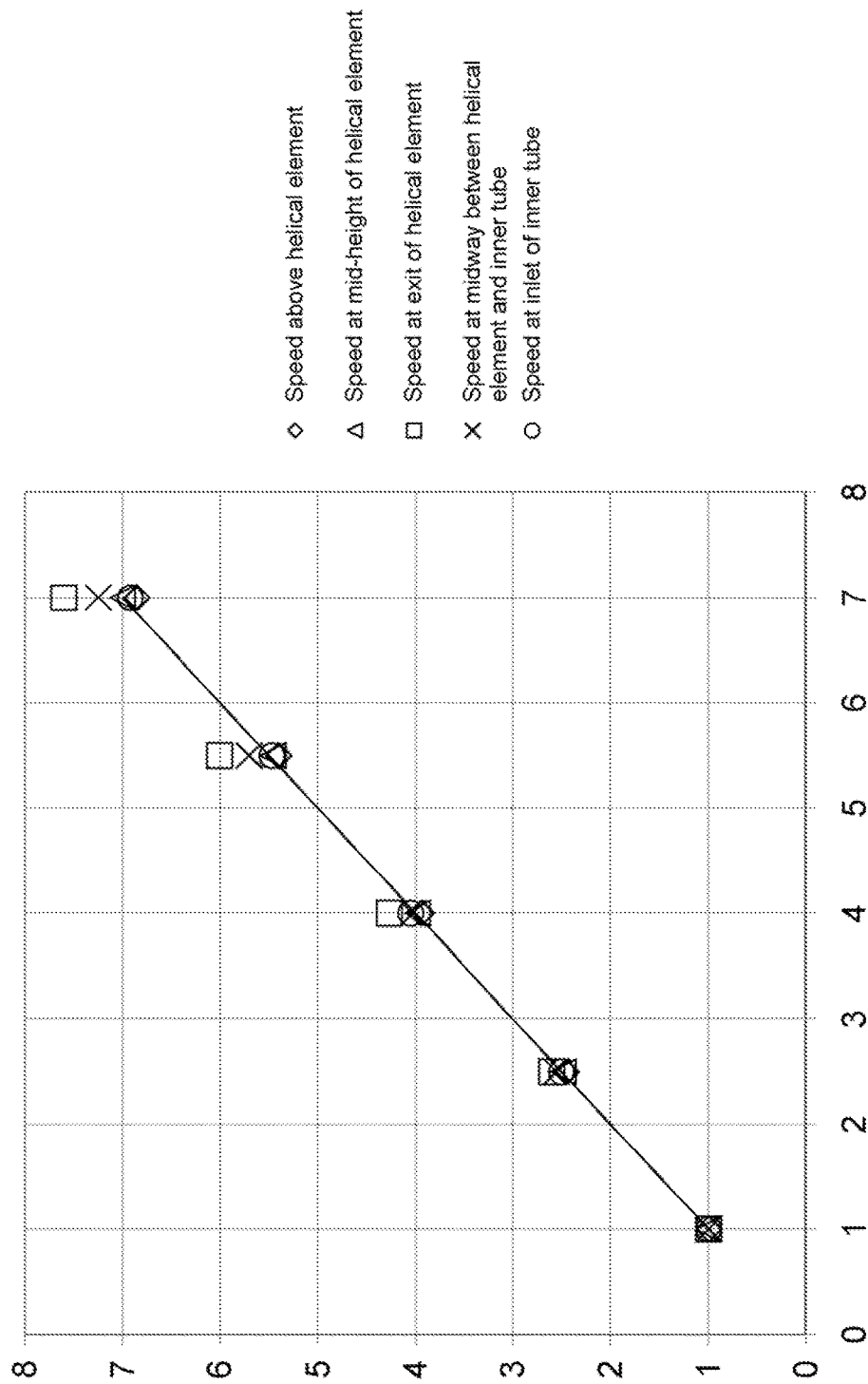
FIG. 12 is a chart depicting the results of CFD analysis.

Using the results above, the model also examined the relationship between mass flow rate and flow velocity (both axial and swirl components) at planes A-E in the helical separator (shown in FIG. 7). The chart in FIG. 12 depicts the maximum velocities calculated at different flow rates normalized by the velocities calculated at the lowest mass flow rate of 1.567 pounds per minute. As shown in FIG. 12, each of the velocities (velocity at the entrance to the helical element 410, velocity inside helical element 410, velocity at exit of helical element 410, velocity in the space between the helical element 410 and the inner tube 430, and velocity at the entrance to the inner tube 430) vary almost linearly with mass flow rate. The analysis thus indicates that the helical separator design is highly scalable, and maintains desirable aerodynamic characteristics for widely varying flow rates.

As noted, the CFD model indicates that a high degree of swirl exists in the space between the helical element 410 and the top of inner tube 430. Particles and/or liquid droplets in this region are pushed radially outwards by the action of centrifugal force associated with the swirling flow. As the particles and/or droplets migrate radially outward, the swirl velocity decreases and the swirl angle increases, creating a region dominated by swirl flow with negligible or very small axial flow. Any liquid, aerosols, or particulate in this region are forced by centrifugal force outward toward the surface of outer tube 420, where the downward axial component of the toroidal vortex (e.g., 560 in FIG. 10) causes the particles to drift into the annular space, thereby separating the particles and/or droplets from the gas.

Where it was previously thought that high G forces beyond 6,000 G's would impede separation, the swirling flow created by embodiments of the present invention suggest the presence of an efficient flow facilitating separation at well beyond 6,000 G's (e.g., 6,800 G's for a mass flow rate of 10.967 pounds per minute). These high centrifugal forces make it practically impossible for any liquid, aerosols, or particulate entrained in the gas flow, even at very small sizes, to avoid separation and collection in the annular space formed between inner tube 430 and outer tube 420.

Test Results

A single, full scale helical separator 400 including helical element 410 was tested in a closed system to determine its effectiveness. Test results were compared to the results achieved under the same conditions using the helical separator and helical element as disclosed in U.S. Pat. No. 7,875,103 (hereinafter "the '103 separator"). Tests were performed using a flow of air supplied by a blower and with three different entrained liquids: 75 weight lubricating oil, propylene glycol, and water. The liquid flow remained constant. Lubricating oil was supplied at 0.1 pounds per minute, glycol anti-freeze at 0.25 pounds per minute, and water at 16 pounds per minute. The separation characteristics of each device were observed at increasing air supply velocities in the range of 4,000 to 7,600 feet per minute.

For the tests performed with oil and glycol as the entrained liquid, the presence of any liquid carried into the clean gas tube (e.g., inner tube 430 in FIG. 2) within 30 minutes of operation indicated that the supplied air velocity exceeded the maximum flow rate for the respective device. Conversely, the absence of any oil or glycol carried into the clean gas tube after 30 minutes of continuous operation indicated that the device effectively separated the air and liquid. For the tests performed with water as the entrained liquid, limitations of the test equipment (i.e., maximum blower air velocity and liquid sump capacity) allowed only five minute of operation. At the effective limits of the test equipment (7,200 feet per minute air velocity), both devices effectively separated all water from the air flow for a period of 5 minutes, even at 16 pounds of water per minute, at which time the tests had to be terminated because the separated water completely filled the 10 gallon sump. For this reason, the experiment was not capable of testing the effective limits of separating water from air for either device.

Table 1 below shows the maximum effective air velocity for each of the tested separators (the '103 separator and an embodiment of the present invention) at the indicated liquid flow rates. In sum, results of this testing suggest that the embodiment of the present invention is about 7-15 percent more efficient than the device disclosed in U.S. Pat. No. 7,875,103.

| Liquid | '103 Separator | Embodiment | Increase (%) |
|---|---|---|---|
| 75w Oil (0.1 lb/min.) | 4,800 | 5,500 | 14.6 |
| Glycol (0.25 lb/min.) | 4,500 | 4,800 | 6.7 |
| Water (16 lb/min.) | 7,200 | 7,200 | — |

Not only was this embodiment found to be more efficient at high liquid-to-gas weight ratios and varying gas flow rates than the helical separator disclosed in U.S. Pat. No. 7,875,103, but the helical elements of the present invention are also much smaller, require less raw materials, and require less time to manufacture. By comparison, the helical elements of the present invention are typically at least 25 percent less expensive than those described in U.S. Pat. No. 7,875,103. Considering that many applications require 100 or more helical elements, the potential cost savings and reduced manufacturing time may be significant.

Another embodiment of a separator is illustrated in FIGS. 13-18. As noted previously in connection with the embodiments illustrated in FIGS. 2-7, liquid streams generally flow along on the walls of the annular space formed between the inside wall of the outer tube 420 and the outside wall of the inner tube 430, and then into the sump 160. The present embodiment illustrated in FIGS. 13-18 recirculates a portion of the gas stream exiting near the bottom of outer tube 720, through the space 152 formed between adjacent helical separators (shown in FIG. 1), then back into the helical element 610, through a transverse bore 620 and an axial bore 630, and, finally, out from the bottom of helical element 610 near the vertex of conical cavity 795. This recirculation is caused chiefly by the pressure differential existing between the extreme low pressure near the vertex of conical cavity 495 and the higher pressure in the space 152 formed between adjacent helical separators.

In order to create a path for the recirculation of gas flow, one or more transverse bores 620 and an interconnected axial bore 630 may be formed in the helical element 610. The resulting passageway formed by bores 620 and 630 provides a recirculating gas flow path R (shown in FIG. 17) between the bottom of the annular space formed between the outer tube 720 and the inner tube 730, and the opening of axial bore 630 near the vertex of conical cavity 695. The recirculating gas flow path R is generated by a very low pressure region near the vertex of conical cavity 695. This low pressure region is created by vortices in the conical cavity 695, such as discussed above in connection with vortices 550 from FIG. 10 and the accompanying text.

Figure 13:
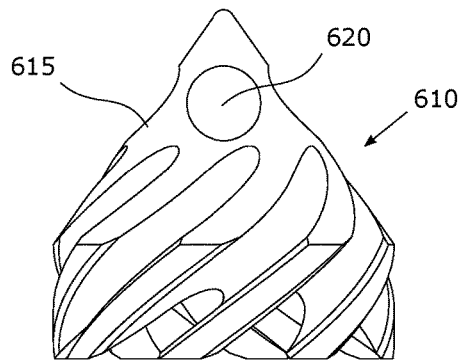
FIG. 13 is a side view of an alternative embodiment of a helical separator element.
Figure 14:
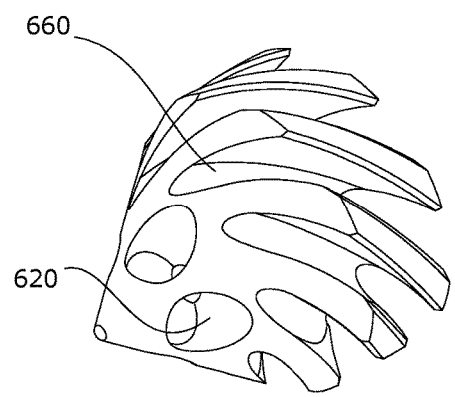
FIG. 14 is a perspective view of the embodiment from FIG. 13.
Figure 15:
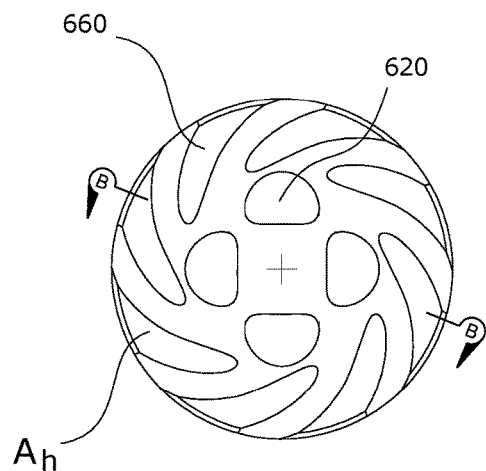
FIG. 15 is a top view of the embodiment from FIG. 13.
Figure 16:
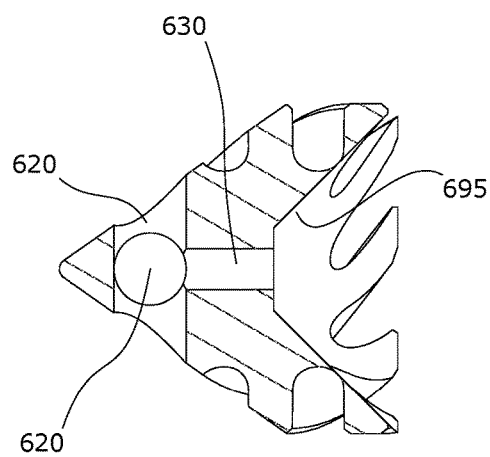
FIG. 16 is a cut-away side view of the embodiment from FIG. 13.

In order to accommodate the transverse bores 620 without interrupting the gas flow path in the helical channels 660, the top portion of separator 610 may form a generally conical shape 615 best illustrated in FIG. 13. Transverse bores 620 may be formed in this conical shape 615 upstream from the start of helical channels 660. Transverse tubes 760 extend through outer tube 720 and connect to transverse bores 620. In this manner, the recirculating gas flow path R is largely unaffected by the upstream gas flow entering the helical separator 610, and does not interfere with the separation of liquid and particulate from the flowing gas stream.

The helical element 610 in the present embodiment is generally a half-scale version of the helical element 410 illustrated in FIGS. 2-7. For example, the outer diameter of the helical element 610 may be 2 inches, and its overall height may be 2.125 inches. The helical element 610 also differs from the previous embodiments by forming a conical shape 615 and including transverse bores 620 and an axial bore 630. The conical shape 615 forms a 35 degree cone extending from the upstream end for approximately 1.375 inches along the axis of helical element 610. Helical channels 660 may form an angle α of about 22 degrees (illustrated in FIG. 6 with respect to the previous embodiments). The helical channels extend from the bottom of the helical element 610 and terminate against the conical shape 615 at a height of about 1.66 inches. The cross-sectional area of each channel ($A_h$ in FIG. 15) is approximately 0.1402 square inches, which provides a total cross-sectional area for all eight channels 660 of about 1.1216 square inches.

Transverse bores 620 may have an inside diameter of approximately 0.3390 inches, and axial bore 630 may have an inside diameter of approximately 0.25 inches. In this embodiment, outer tube 720 has an inside diameter of about 2 inches, and inner tube 730 has an inside diameter of about 0.75 inches and a cross-sectional area ($A_t$ in FIG. 17) of about 0.442 square inches. Inner tube 730 may be spaced apart from the bottom of helical element 610 by about 3.9375 inches.

Figures 17, 18:
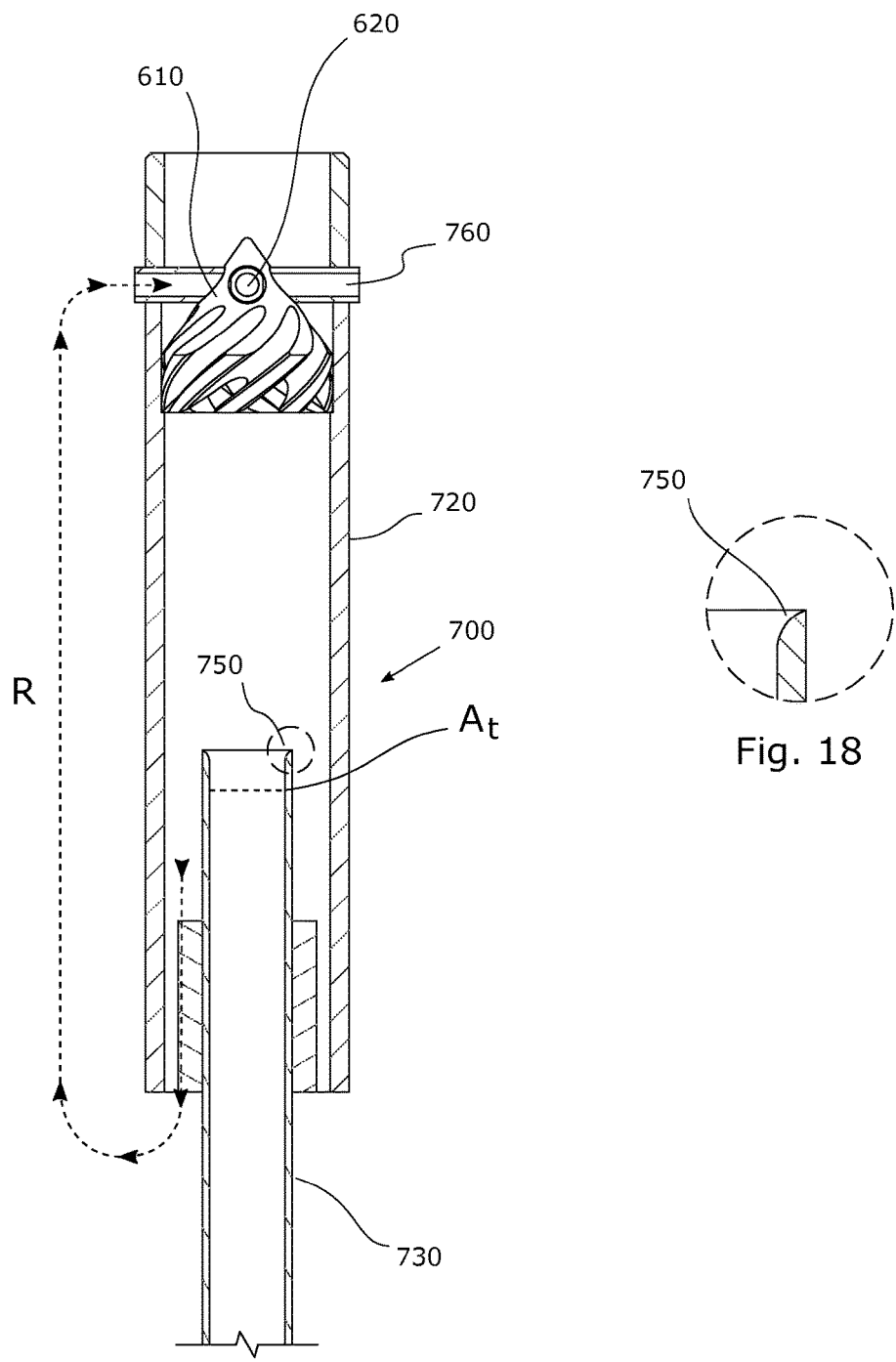
FIG. 17 is a cut-away side view of an embodiment of a helical separator using the helical separator element from FIG. 13.
FIG. 18 is an enlarged cross-section side view of the circled portion in FIG. 17.

In the previous embodiments described in connection with FIGS. 2-7, inner tube 430 formed a small rim lip 450 at the top end to inhibit any sheet flow of liquid from creeping upward and over the top of inner tube 430. In the present embodiment, the recirculation of gas flow tends to inhibit this sheet flow. Thus, the upper end of inner tube 730 need not employ a rim lip. Instead, as shown in FIG. 18, the upper end of inner tube 730 may have a smooth exterior surface and rounded interior surface 750.

In comparison to the previous embodiments, the recirculating gas flow path R created in the present embodiment tends to bias flow toward the annular space near the bottom of outer tube 720. This biased flow tends to clear any high liquid loading or slug flow passing through the helical separator 700 of the present embodiment more effectively than the embodiments illustrated in FIGS. 2-7. Thus, the present embodiment may be more suitable to applications wherein high liquid loading or frequent slug flow may be expected.

While various system and method embodiments have been shown and described herein, it should be understood that the disclosed systems and methods may be embodied in many other specific forms without departing from the spirit or scope of the invention. The present examples are to be considered as illustrative and not restrictive. The intention is not to be limited to the details given herein, but may be modified within the scope of the appended claims along with their full scope of equivalents.

What is claimed is:

1. A system for particle collection and hydraulic removal comprising:

a separator vessel with a gas stream inlet, a gas stream outlet, and forming a space therein;

a vertically oriented outer tube with a top and a bottom positioned within the space in the vessel;

a generally cylindrical separator element disposed within and near the top of the outer tube, the separator element having a central axis and forming a generally conical shape at an upstream end, and forming a generally conical cavity at the bottom surface thereof;

a vertically oriented inner tube axially aligned within the outer tube and axially spaced apart beneath the separator element, the inner and outer tubes forming an annular space therebetween;

a plurality of helical gas flow paths formed by radially diverging fins extending from the separator element;

such that the annular space forms a flow path for liquid or particulate separated from the gas, and the inner tube forms a flow path for gas separated from the liquid or particulate; and a recirculating gas flow path extending from the downstream end of the annular space, through the space in the vessel, into a transverse passageway formed by a conduit extending from a hole in the outer tube to a transverse bore in the conical shape, into an axial passageway in the separator element, and exiting near the vertex of the conical cavity.

2. The system of claim 1 wherein the transverse passageway and the axial passageway are both closed to an upstream gas stream entering the system.

3. The system of claim 1 wherein the transverse passageway is generally perpendicular to the axial passageway.

4. The system of claim 2 wherein the transverse passageway is upstream from the helical gas flow paths.

5. The system of claim 2 further comprising:
a waste liquid sump at the bottom of the vessel;
a waste liquid recovery tank hydraulically connected to the waste liquid sump;
wherein the outer tube is above the sump;
such that liquid or particulate separated from the gas flows to the sump, and gas separated from the liquid or particulate flows from the inner tube to the gas stream outlet.

6. A system for particle collection and hydraulic removal comprising:
a separator vessel with a gas stream inlet, a gas stream outlet, and forming a space therein;
a vertically oriented outer tube with a top and a bottom positioned within the space in the vessel;
a generally cylindrical separator element disposed within and near the top of the outer tube, the separator element having a central axis and forming a generally conical shape at an upstream end, and forming a generally conical cavity at the bottom surface thereof;
a vertically oriented inner tube axially aligned within the outer tube and axially spaced apart beneath the separator element, the inner and outer tubes forming an annular space therebetween;

a plurality of helical gas flow paths formed by radially diverging fins extending from the separator element, and a rounded radius in the separator element between adjacent fins;

such that the annular space forms a flow path for liquid or particulate separated from the gas, and the inner tube forms a flow path for gas separated from the liquid or particulate; and a recirculating gas flow path extending from the downstream end of the annular space, through the space in the vessel, into a transverse passageway formed by a conduit extending from a hole in the outer tube to a transverse bore in the conical shape, into an axial passageway in the separator element, and exiting near the vertex of the conical cavity.

7. The system of claim 6 wherein:
the helical gas flow paths have a generally bell-shaped cross section; and
the transverse passageway and the axial passageway are both closed to an upstream gas stream entering the system.

8. The system of claim 7 wherein the helical gas flow paths have a combined cross-sectional area that exceeds the open cross-sectional area of the inner tube.

9. The system of claim 7 further comprising:
a waste liquid sump at the bottom of the vessel;
a waste liquid recovery tank hydraulically connected to the waste liquid sump;
wherein the outer tube is above the sump;
such that liquid or particulate separated from the gas flows to the sump, and gas separated from the liquid or particulate flows from the inner tube to the gas stream outlet.

10. The system of claim 6 further comprising:
a waste liquid sump at the bottom of the vessel;
a waste liquid recovery tank hydraulically connected to the waste liquid sump;
wherein the outer tube is above the sump;
such that liquid or particulate separated from the gas flows to the sump, and gas separated from the liquid or particulate flows from the inner tube to the gas stream outlet.

* * * * *